(12) United States Patent
Sekiuchi

(10) Patent No.: US 12,722,523 B2
(45) Date of Patent: Sep. 1, 2026

(54) RESTRICTION APPARATUS

(71) Applicant: Isuzu Motors Limited, Yokohama (JP)

(72) Inventor: Takahiro Sekiuchi, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 283 days.

(21) Appl. No.: 18/427,911

(22) Filed: Jan. 31, 2024

(65) Prior Publication Data

US 2024/0253515 A1 Aug. 1, 2024

(30) Foreign Application Priority Data

Feb. 1, 2023 (JP) ................................ 2023-014057

(51) Int. Cl.
*B60L 53/80* (2019.01)
*B60K 1/04* (2019.01)
*B60L 50/60* (2019.01)
*B60L 50/64* (2019.01)

(52) U.S. Cl.
CPC ................ *B60L 53/80* (2019.02); *B60K 1/04* (2013.01); *B60L 50/64* (2019.02); *B60L 50/66* (2019.02); *B60K 2001/0494* (2013.01)

(58) Field of Classification Search
CPC .......... B60L 53/80; B60L 50/66; B60L 50/64; H01M 50/264; H01M 50/262; H01M 2220/20; H01M 50/202; B60K 1/04; B60K 2001/0494; B60K 2001/0438; B60K 2001/0472; B60K 2001/0461; B60K 2001/0444
See application file for complete search history.

(56) References Cited

U.S. PATENT DOCUMENTS

| | | | | |
|---|---|---|---|---|
| 5,360,307 | A | 11/1994 | Schemm et al. | |
| 2019/0263269 | A1* | 8/2019 | Huff | B60K 1/04 |
| 2023/0191939 | A1 | 6/2023 | Zhang et al. | |
| 2024/0030541 | A1* | 1/2024 | Zhang | H01M 50/262 |
| 2024/0234908 | A1* | 7/2024 | Zhang | H01M 50/249 |

FOREIGN PATENT DOCUMENTS

| | | |
|---|---|---|
| CN | 113415144 | 9/2021 |
| DE | 19955523 | 6/2001 |
| DE | 19956623 | 6/2001 |
| JP | 63-070661 | 5/1988 |
| JP | 2002-362261 | 2/2002 |
| JP | 2005-096503 | 4/2005 |
| JP | 2006-096148 | 4/2006 |
| JP | 2006-351277 | 12/2006 |
| JP | 2012-232625 | 11/2012 |

* cited by examiner

*Primary Examiner* — Timothy Hannon

(57) ABSTRACT

A restriction apparatus includes a movement section, a rotation section, and a restriction section, and during when the movement section moves from a replacement position to a mounting position, the rotation section makes contact with the restriction section to rotate from a first position to a second position, and the rotation section passes a position of the restriction section to return to the first position.

5 Claims, 6 Drawing Sheets

RESTRICTION APPARATUS

RELATED APPLICATION

This application claims the benefit of priority of Japan Patent Application No. 2023-014057 filed on Feb. 1, 2023, the contents of which are incorporated by reference as if fully set forth herein in their entirety.

TECHNICAL FIELD

The present disclosure relates to a restriction apparatus.

BACKGROUND ART

Conventionally, in a vehicle including a battery, such as an electric vehicle or a hybrid vehicle, the battery is fixed to a vehicle body inside the vehicle. For example, Patent Literature (hereinafter, referred to as "PTL") 1 discloses a configuration including a main lock apparatus and a fail-safe lock apparatus for preventing a battery from falling due to an unlocked state of the main lock apparatus caused by a malfunction or the like.

CITATION LIST

Patent Literature

PTL 1
Japanese Patent Application Laid-Open No. 2002-362261

SUMMARY OF INVENTION

Technical Problem

Meanwhile, some vehicles have a configuration in which a battery can be pulled out of and housed in the vehicles between the inside and the outside of the vehicles via a slide portion, but in this configuration, there is a possibility that the battery is pulled out at a timing unintended by an operator due to an inclined state during when the vehicle is parked.

An object of the present disclosure is to provide a restriction apparatus capable of suppressing a battery from being pulled out at a timing unintended by an operator.

Solution to Problem

A restriction apparatus according to the present disclosure includes:

- a movement section that moves a battery between a mounting position and a replacement position in a vehicle;
- a rotation section disposed on either one of the movement section and the vehicle side,
- the rotation section being configured to rotate between a first position and a second position; and
- a restriction section that is disposed on an other of the movement section and the vehicle, the restriction section being configured to restrict movement of the movement section from the mounting position by making contact with the rotation section located at the first position in a state where the movement section is located at the mounting position, in which
- during when the movement section moves from the replacement position to the mounting position, the rotation section makes contact with the restriction section to rotate from the first position to the second position, and the rotation section passes a position of the restriction section to return to the first position.

Advantageous Effects of Invention

According to the present disclosure, it is possible to prevent a battery from being pulled out at a timing that is not intended by an operator.

DESCRIPTION OF EMBODIMENTS

Figure 1:
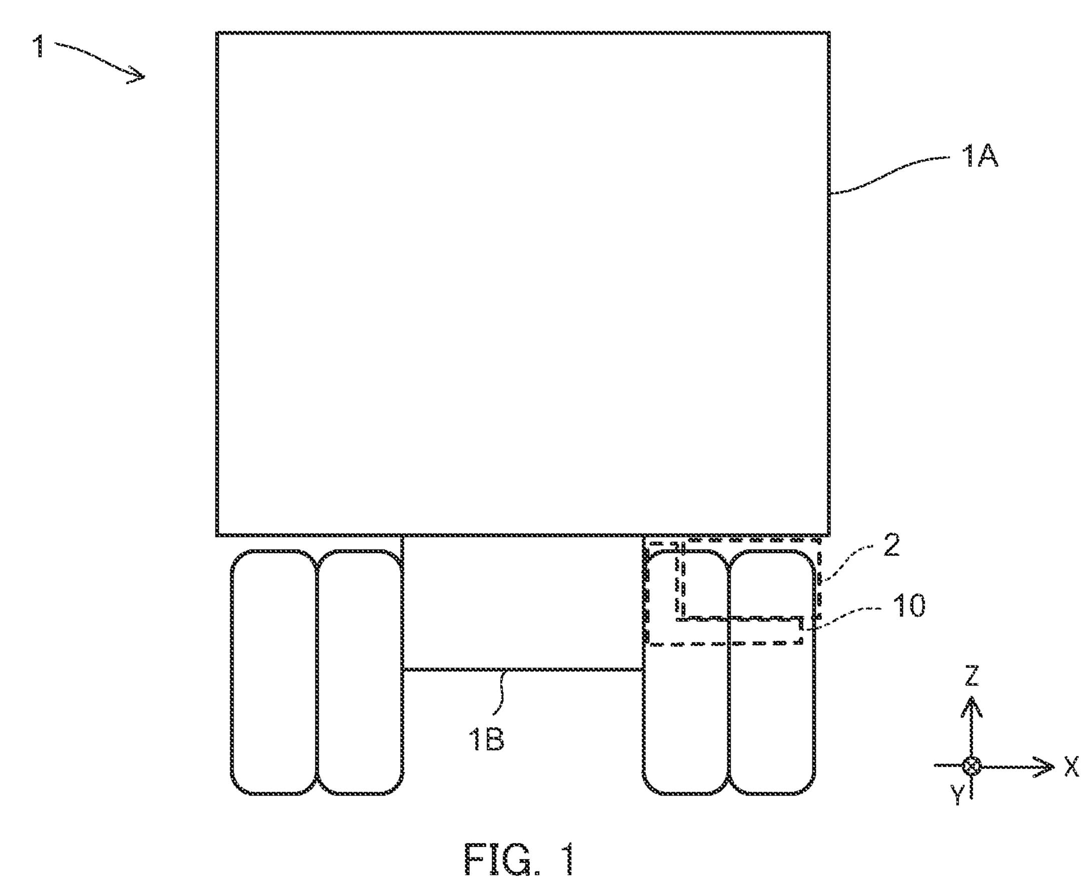
FIG. 1 is a diagram illustrating a vehicle including a restriction apparatus according to an embodiment of the present disclosure.

Hereinafter, embodiments of the present disclosure will be described in detail based on the drawings. FIG. 1 is a diagram illustrating a vehicle including a restriction apparatus according to an embodiment of the present disclosure.

In describing the configuration of the restriction apparatus of the present embodiment, an orthogonal coordinate system (X, Y, Z) is used. The same orthogonal coordinate system (X, Y, Z) is illustrated also in the figures to which reference is made in the following descriptions. The X-direction indicates the left-right direction of vehicle 1 on which the restriction apparatus is mounted, the Y-direction indicates the front-rear direction of vehicle 1, and the Z-direction indicates the up-down direction of vehicle 1.

As illustrated in FIG. 1, vehicle 1 is such a vehicle as an electric vehicle or a hybrid vehicle which can travel by battery 2. Vehicle 1 is also a large vehicle such as a truck, and is equipped with loading platform 1A. In addition, attachment apparatus 10 for attachment of battery 2 is disposed on vehicle body 1B of vehicle 1 on which loading platform 1A is mounted.

Figure 2:
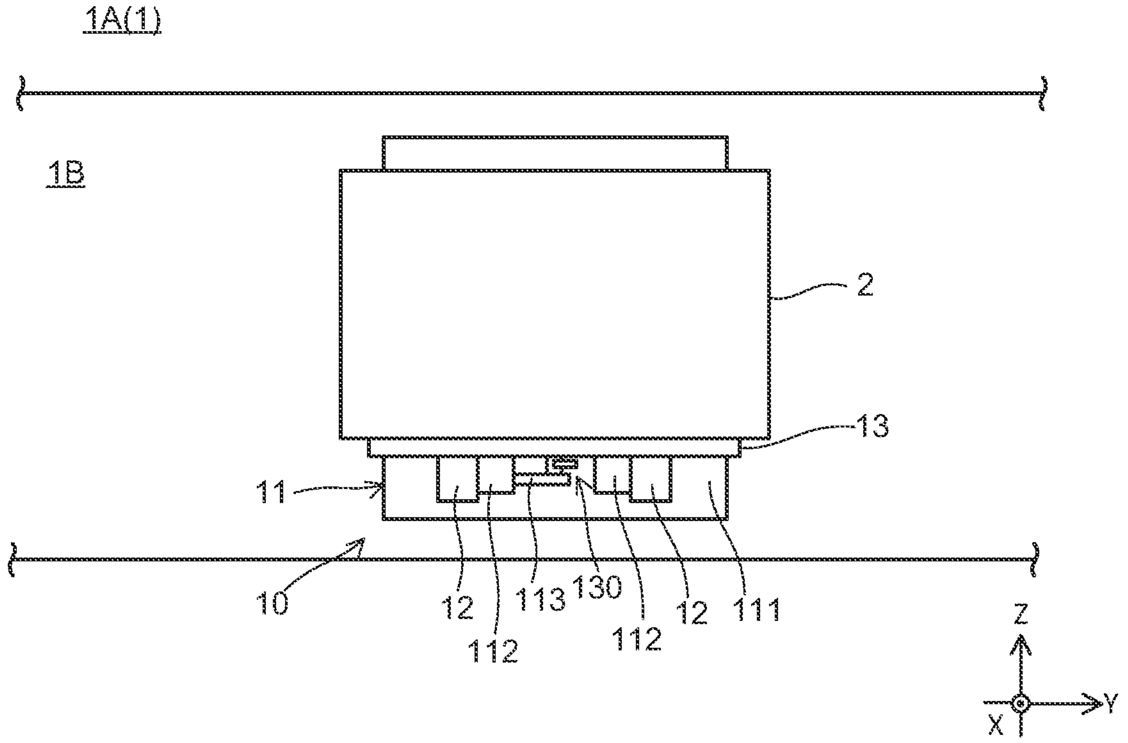
FIG. 2 is a view of the restriction apparatus according to the present embodiment as viewed in the X-direction.

As illustrated in FIG. 2, attachment apparatus 10 includes main body portion 11, slide portion 12, and placement portion 13.

Main body portion 11 is disposed at a position corresponding to the lower side (the − side in the Z-direction) of loading platform 1A, and includes wall portion 111 and support portions 112.

Wall portion 111 is a wall disposed along the Z-direction, and is fixed to, for example, a side surface (the + side in the X-direction) of vehicle body 1B. Wall portion 111 is provided with latch 111A that is engaged with striker 2A disposed on the side surface of battery 2 (see FIG. 3B). When latch 111A and striker 2A are engaged with each other, battery 2 is fixed to vehicle 1.

Support portions 112 are members extending toward the + side in the X-direction from the end portion of wall portion 111 on the − side in the Z-direction, and two support portions are disposed alongside with each other in the Y-direction. Support portions 112 are disposed to support placement portion 13 and battery 2 from the − side in the Z-direction when battery 2 is fixed to vehicle 1.

Further, support portions 112 are provided with restriction member 113 for restricting the movement of battery 2 from the inner position (the mounting position illustrated in FIG. 3A) to the outer position (the replacement position illustrated in FIG. 3B) of vehicle 1. Restriction member 113 corresponds to the "restriction section" of the present disclosure.

For example, restriction member 113 is configured to extend to the + side in the Y-direction from one of two support portions 112 which is positioned on the − side in the Y-direction. Note that restriction member 113 does not have to be disposed on support portion 112, and may be disposed at any location on vehicle body 1B, for example.

Restriction member 113 is disposed on an end portion of support portion 112 on the + side in the X-direction, and is positioned on the + side in the X-direction with respect to below-described rotation section 130 when battery 2 is positioned at the inner position of vehicle 1.

Slide portions 12 are an telescopic slide rail for moving battery 2 between the inner position in vehicle 1 and the outer position. Slide portions 12 are fixed respectively to support portions 112, for example.

Figure 3A:
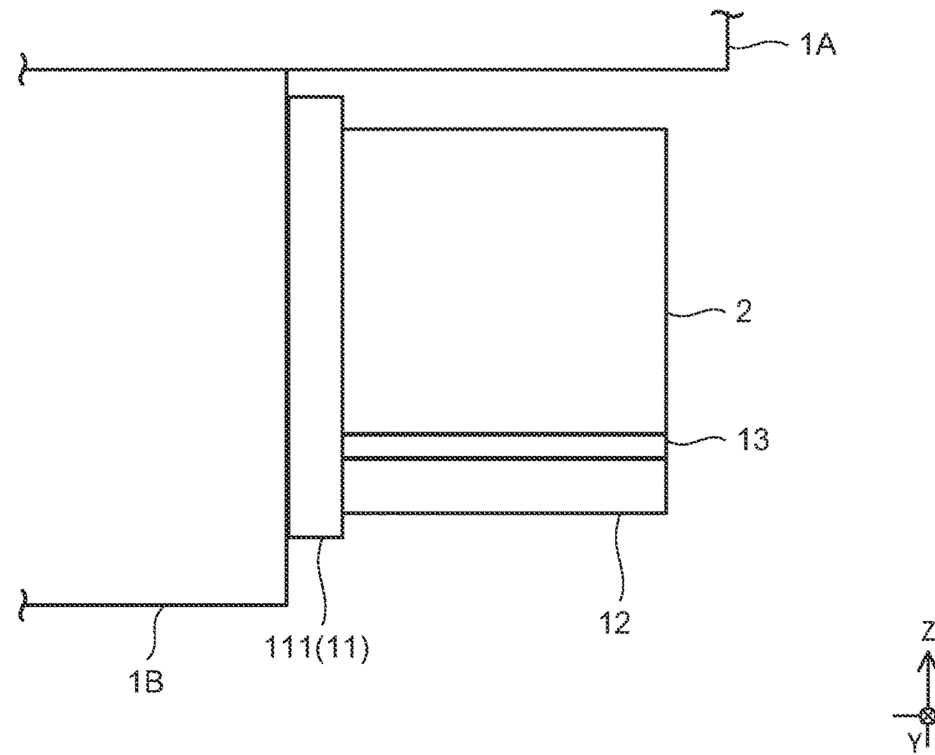
FIG. 3A is a diagram for explaining movement of a battery between an inner position and an outer position.

As illustrated in FIG. 3A, slide portions 12 are located in the inner range of vehicle 1 in the X-direction when being in the most retracted state. The above-described inner position is a position where battery 2 is not positioned outside vehicle 1 in the X-direction, and may be, for example, a position of battery 2 (placement portion 13) when slide portions 12 are in the most retracted state. The inner position may be a mounting position of battery 2 in vehicle 1.

Figure 3B:
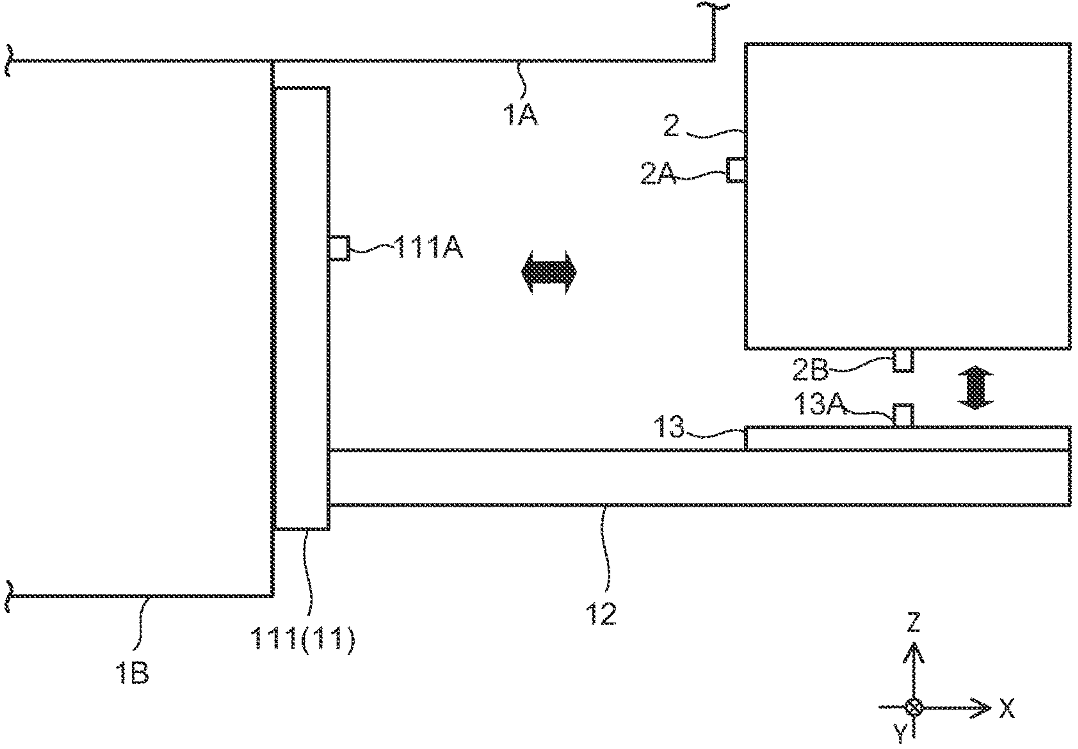
FIG. 3B is a diagram for explaining the movement of the battery between the inner position and the outer position.

As illustrated in FIG. 3B, when slide portions 12 are in the most extended position, the distal end portions are located on the + side in the X-direction with respect to loading platform 1A, that is, in a range outside vehicle 1. The above-described outer position is a position outside vehicle 1 in the X-direction at which battery 2 is detachable from placement portion 13, and may be, for example, a position of battery 2 (placement portion 13) in a state where slide portions 12 are most extended. The outer position may also be a replacement position for replacement of battery 2.

Placement portion 13 is a portion on which battery 2 is placed, and is attached to slide portions 12. Latch 13A to be engaged with striker 2B disposed on a bottom surface of battery 2 is disposed on a surface of placement portion 13 on the + side in the Z-direction. When latch 13A and striker 2B are engaged with each other, battery 2 is fixed to placement portion 13. Placement portion 13 corresponds to the "movement section" of the present disclosure.

Further, when latch 13A and striker 2B are disengaged from each other when placement portion 13 is positioned in the range outside vehicle 1, battery 2 can be detached and replaced.

Figure 4:
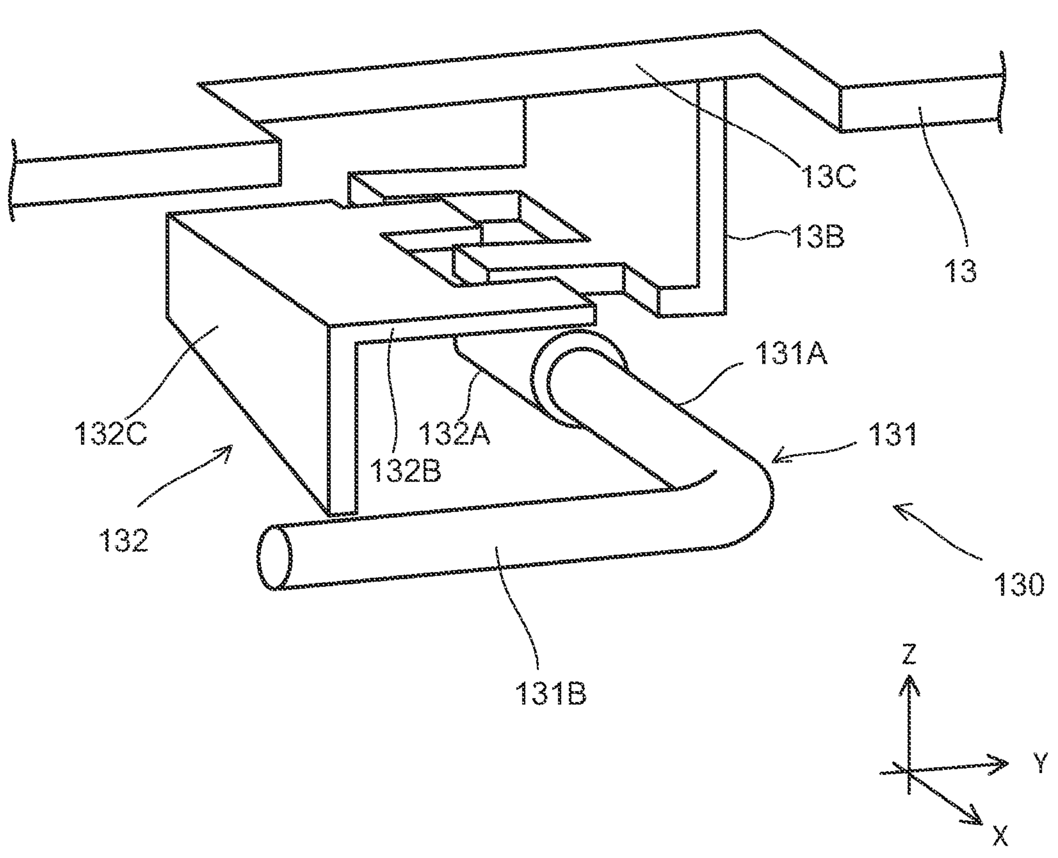
FIG. 4 is a perspective view of a rotation section.

Further, as illustrated in FIG. 4, support portion 13B is disposed on a surface of placement portion 13 on the − side in the Z-direction. Support portion 13B is disposed at a position corresponding to the end portion of placement portion 13 on the + side in the X-direction, and is disposed to protrude from placement portion 13.

Support portion 13B supports rotation section 130 for restricting the movement of battery 2 from the inner position in vehicle 1 to the outer position. Support portion 13B includes, at an end portion on the − side in the Z-direction, two cylindrical portions 13D arranged at an interval in the X-direction, and supports rotation section 130 by cylindrical portions 13D (see FIG. 5A). Support portion 13B corresponds to the "support member" of the present disclosure.

Further, placement portion 13 includes, at the end portion on the + side in the X-direction, notch 13C disposed at a position corresponding to support portion 13B.

Figure 5A:
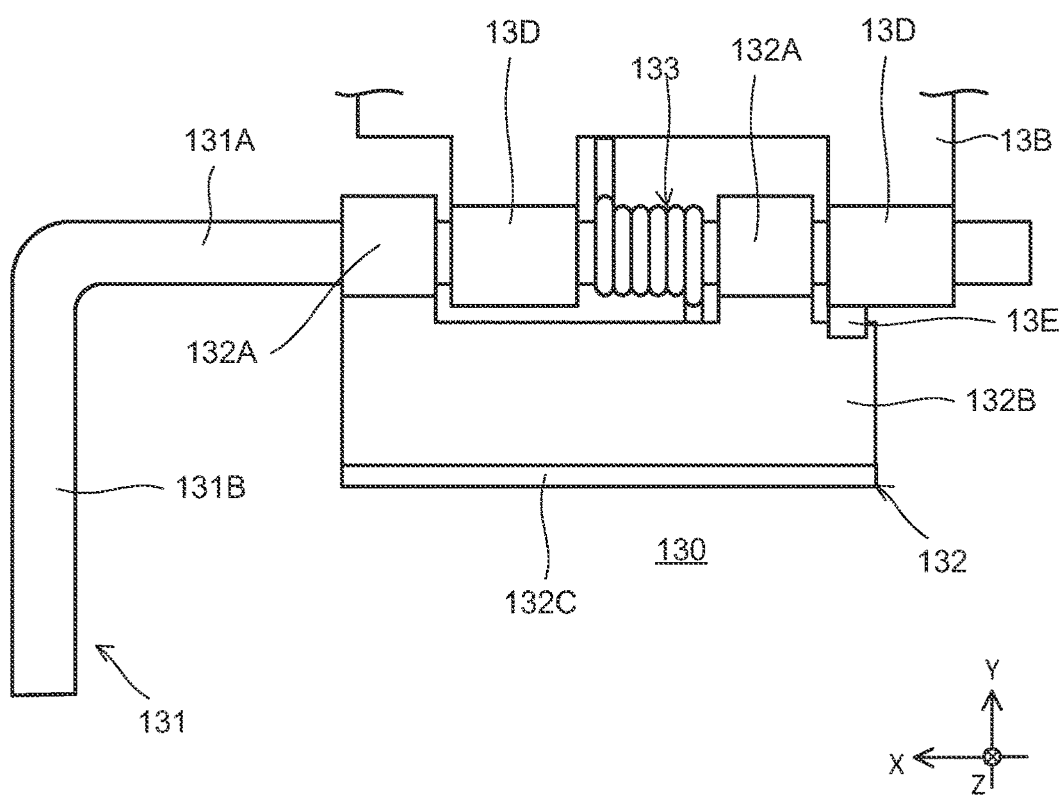
FIG. 5A is a view of the rotation section as seen from the − side in the Z-direction.
Figure 5B:
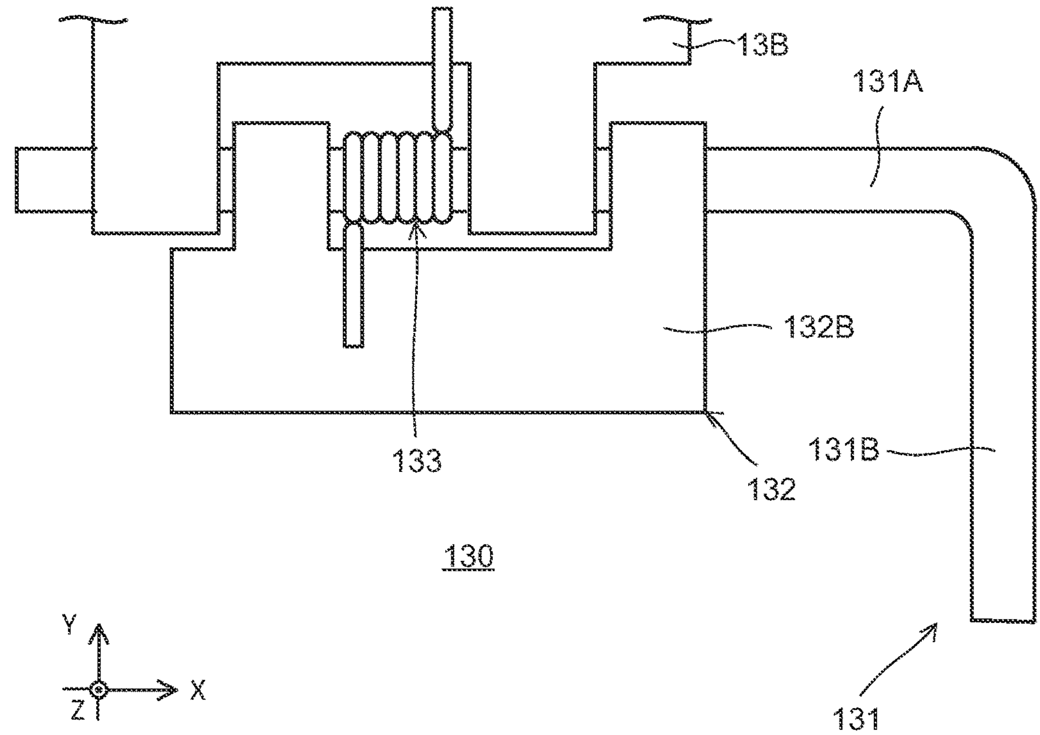
FIG. 5B is a view of the rotation section as seen from the + side in the Z-direction.

As illustrated in FIGS. 5A and 5B, rotation section 130 is disposed at an outer end portion (the end portion on the + side in the X-direction) of placement portion 13, and includes manipulation member 131, rotation member 132, and biasing member 133.

Manipulation member 131 is formed of a rod-shaped pin, and includes supported portion 131A and manipulation portion 131B.

Supported portion 131A is a portion that is supported pivotally by cylindrical portions 13D of support portion 13B of placement portion 13, and is disposed along the X-direction. Supported portion 131A is pivotally supported by cylindrical portions 13D, and accordingly, manipulation member 131 rotates around supported portion 131A as a rotation center (see FIGS. 6A and 6B).

Manipulation portion 131B is for rotary manipulation of rotation section 130 by an operator or a restriction releasing apparatus, and is configured to extend in a direction perpendicular to the X-direction from the end portion of supported portion 131A on the + side in the X-direction. In the example illustrated in FIG. 5A and the like, manipulation portion 131B extends from the end portion on the + side of supported portion 131A in the X-direction toward the − side in the Y-direction.

Manipulation portion 131B is disposed at an outermost position (a position corresponding to the outer end portion of placement portion 13) in rotation section 130, that is, at a position corresponding to above-described notch 13C.

Rotation member 132 is disposed at a position allowing the rotation member to make contact with restriction member 113, and is attached to supported portion 131A of manipulation member 131. Rotation member 132 rotates together with manipulation member 131 as a result of rotary manipulation of manipulation member 131. Rotation member 132 includes attached portion 132A, extending portion 132B, and contact portion 132C.

Attached portion 132A is composed of two claw portions that can be attached to supported portion 131A. The two claw portions are spaced apart from each other in the X-direction, and are attached to supported portion 131A such that the two claw portions and two cylindrical portions 13D of support portion 13B alternate each other. That is, attached portion 132A and support portion 13B constitute a hinge configuration.

Extending portion 132B extends from attached portion 132A toward the – side in the Y-direction, and is formed in a plate shape that is larger than the area in which attached portion 132A is disposed.

In addition, stopper 13E that restricts the rotation of rotation member 132 is disposed on one of two cylindrical portions 13D which is on the – side in the X-direction. Stopper 13E is disposed to protrude from cylindrical portion 13D toward the – side in the Y-direction, and is disposed to be positioned on the – side of extending portion 132B in the Z-direction.

As a result, the rotation of rotation member 132 toward the – side in the Z-direction is restricted when extending portion 132B is disposed along the XY plane.

Contact portion 132C is a portion making contact with restriction member 113, and extends toward the – side in the Z-direction from an end portion of extending portion 132B disposed along the XY plane, the end portion being on the + side in the Y-direction.

An end face of contact portion 132C on the – side in the Z-direction is an inclined surface. Specifically, when contact portion 132C is disposed along the Z-direction, the end face of contact portion 132C on the – side in the Z-direction is inclined to be positioned more on the – side in the Z-direction toward the + side in the X-direction (see FIG. 7A).

A portion of the end face of contact portion 132C on the – side in the Z-direction, which is located on the most – side in the X-direction, is located on the + side in the Z-direction with respect to restriction member 113. A portion of the end face of contact portion 132C on the – side in the Z-direction, which is located on the most + side in the X-direction, is located on the – side in the Z-direction with respect to the end face of restriction member 113 on the + side in the Z-direction.

Figure 7A:
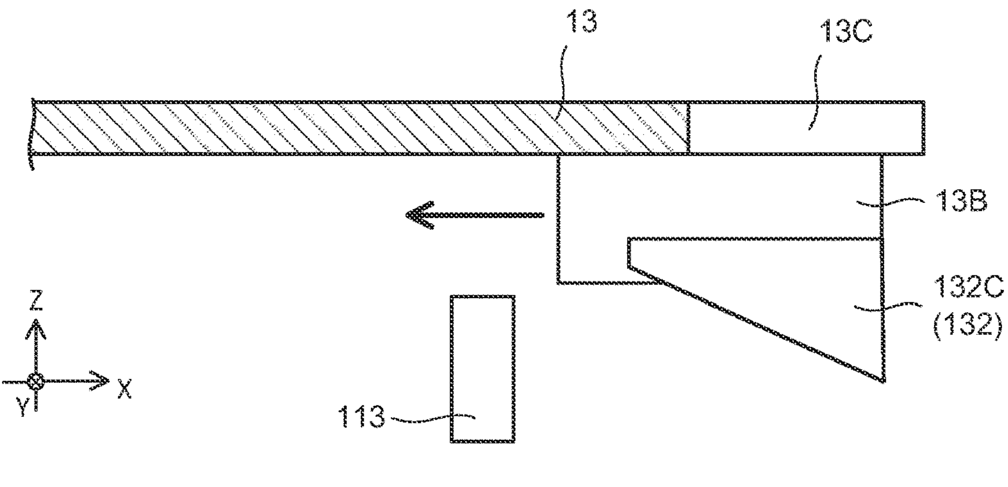
FIG. 7A is a view for explaining the operation of a rotation member performed when moving from the outer position to the inner position.
Figure 7B:
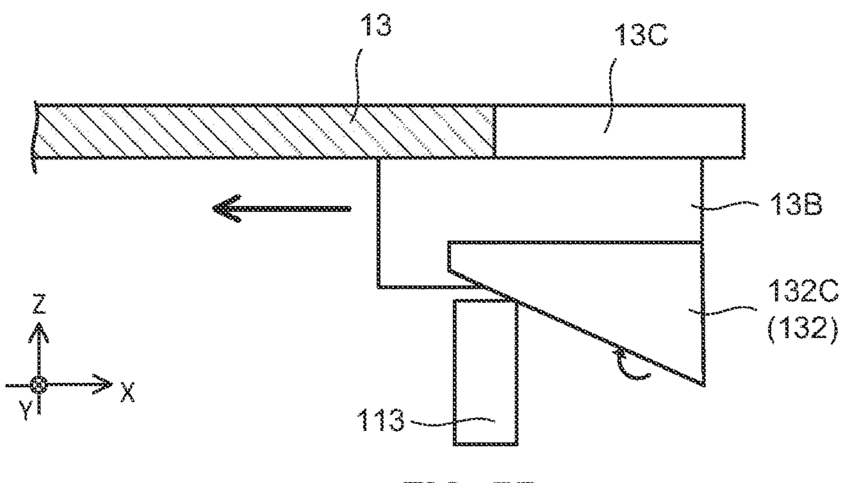
FIG. 7B is a view for explaining the operation of the rotation member performed when moving from the outer position to the inner position.

That is, when contact portion 132C is disposed along the Z-direction, and when placement portion 13 moves from the outer position to the inner position, the contact portion comes into contact with restriction member 113 at the inclined surface (see FIG. 7B).

Further, when contact portion 132C is disposed along the Z-direction, and when placement portion 13 is positioned at the inner position, contact portion 132C comes into contact with restriction member 113 at the end face on the + side in the X-direction.

Biasing member 133 is, for example, a spring member that biases rotation member 132, and is attached to supported portion 131A between the two claw portions of attached portion 132A. Biasing member 133 biases extending portion 132B toward stopper 13E.

As a result, rotation member 132 is disposed such that extending portion 132B extends along the X-direction and contact portion 132C extends along the Z-direction unless an external force is applied. That is, when no external force is applied, rotation member 132 is disposed at a restriction position (first position) where the movement of battery 2 is restricted by restriction member 113.

Therefore, when placement portion 13 is positioned at the inner position, rotation member 132 comes into contact with restriction member 113 at the end face of contact portion 132C on the + side in the X-direction, and is thus restricted from moving from the inner position to the outer position.

In addition, when placement portion 13 moves from the outer position to the inner position, rotation member 132 is positioned at a non-restriction position (second position) where the movement of battery 2 is not restricted by restriction member 113 since, following the movement of placement portion 13, rotation member 132 comes into contact with restriction member 113 at the inclined surface of contact portion 132C and is thus pushed upward by restriction member 113 to rotate (see FIG. 7B). Consequently, when placement portion 13 moves from the outer position to the inner position, the portion of rotation member 132 can pass the position of restriction member 113.

Figure 7C:
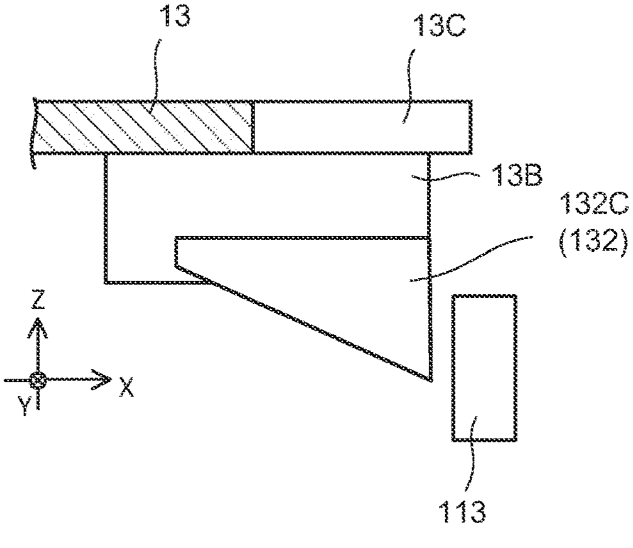
FIG. 7C is a view for explaining the operation of the rotation member performed when moving from the outer position to the inner position.

Further, after rotation member 132 passes the position of restriction member 113, biasing member 133 returns rotation member 132 from the non-restriction position to the restriction position (see FIG. 7C).

Next, an operation of attachment apparatus 10 will be described.

When battery 2 is replaced, battery 2 attached to attachment apparatus 10 is pulled out from the inner position in vehicle 1 to the outer position. In this case, the engagement between striker 2A of battery 2 and latch 111A of wall portion 111 of main body portion 11 is first released.

Here, for example, when the parking position of vehicle 1 is inclined on the – side in the Z-direction toward the + side in the X-direction, there is a possibility that placement portion 13 of slide portion 12 is pulled out due to the weight of battery 2 without intention of an operator.

Figure 6A:
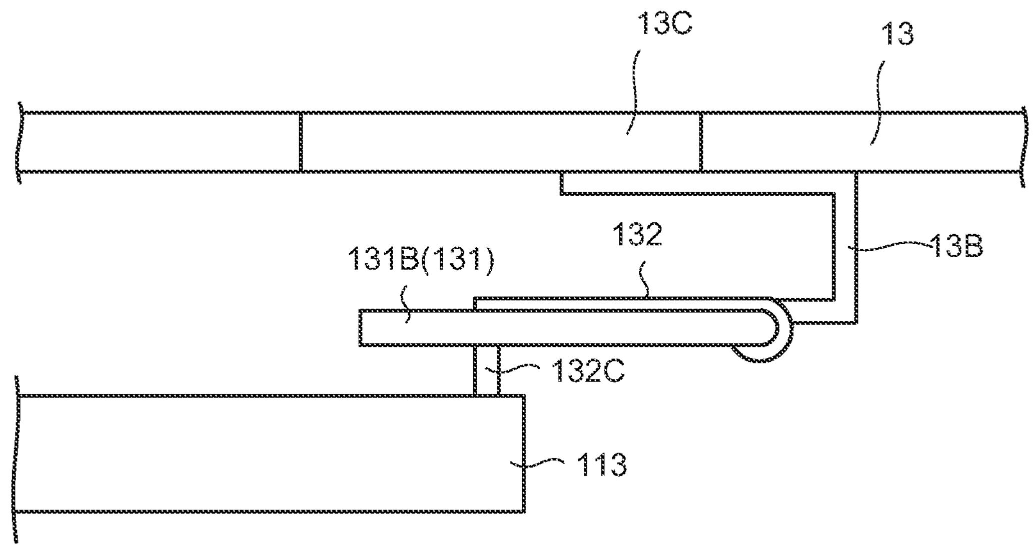
FIG. 6A is a diagram for explaining the rotation of the rotation section.
Figure 6A:
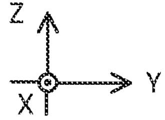

In contrast, in the present embodiment, as illustrated in FIG. 6A, contact portion 132C of rotation member 132 is located at the restriction position, and the end face of contact portion 132C on the + side in the X-direction comes into contact with rotation member 132. Accordingly, the movement of placement portion 13 toward the + side in the X-direction is restricted.

Consequently, it is possible to prevent placement portion 13 from being pulled out contrary to the intention of the operator.

Figure 6B:
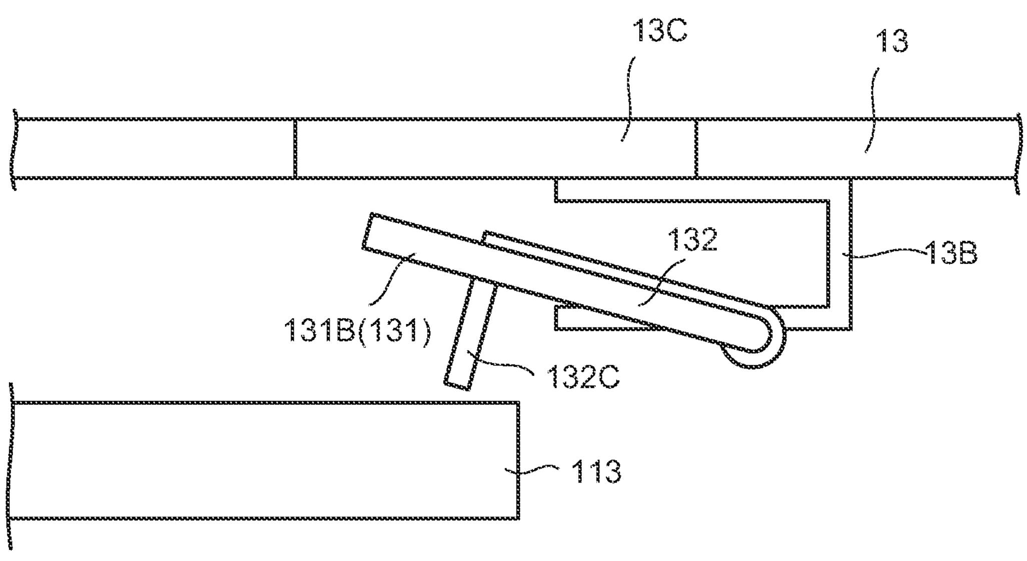
FIG. 6B is a diagram for explaining rotation of the rotation section.
Figure 6B:
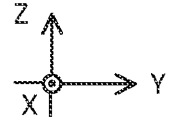

After the engagement between striker 2A and latch 111A is released, the operator rotates manipulation portion 131B of manipulation member 131 toward the + side in the Z-direction as illustrated in FIG. 6B. Thus, the contact between contact portion 132C of rotation member 132 and restriction member 113 is released. That is, since rotation member 132 is positioned at the non-restriction position, movement restriction of placement portion 13 by restriction member 113 is released.

Consequently, placement portion 13 can be pulled out via slide portion 12.

Then, by releasing the engagement between latch 13A of placement portion 13 and striker 2B of battery 2, battery 2 can be removed and new battery 2 can be placed on placement portion 13.

After new battery 2 is placed on placement portion 13, battery 2 is moved from the outer position to the inner position via slide portion 12, and is attached to wall portion 111.

At this time, since restriction member 113 is present as illustrated in FIGS. 7A and 7B, rotation member 132 comes into contact with restriction member 113 by movement of battery 2 from the outer position to the inner position.

Here, part of the inclined surface of contact portion 132C of rotation member 132 comes into contact with restriction member 113, and the inclined surface of contact portion 132C is moved up onto restriction member 113 by the movement of placement portion 13 toward the – side in the X-direction.

Accordingly, a force for causing rotation member 132 to rotate toward the + side in the Z-direction acts on rotation member 132, and rotation member 132 thus rotates. Then, rotation section 130 moves to the non-restriction position on the – side of restriction member 113 in the X-direction, as illustrated in FIG. 7B. It is thus possible to move battery 2 to the inner position only by the manipulation of moving placement portion 13 without the operator manipulating rotation section 130.

Further, after rotation member 132 passes the position of restriction member 113, biasing member 133 returns rotation member 132 from the non-restriction position to the restriction position as illustrated in FIG. 7C. Consequently, the movement of placement portion 13 located at the inner position to the outer position is restricted again.

According to the present embodiment configured as described above, rotation member 132 and restriction member 113 come into contact with each other, and accordingly, the movement of placement portion 13 at the inner position toward the outer position is restricted. It is thus possible to prevent battery 2 from being pulled out at a timing that is not intended by the operator.

Further, since rotation member 132 is biased toward the restriction position by biasing member 133, rotation member 132 returns to the restriction position after rotation member 132 passes the position of restriction member 113, and stops at the restriction position unless a force for rotating rotation member 132 acts on rotation member 132. Thus, even when placement portion 13 attempts to move from the inner position to the outer position, rotation member 132 makes contact with restriction member 113. Accordingly, the movement of placement portion 13 can be reliably restricted.

Further, the end face of contact portion 132C on the − side in the Z-direction is inclined to be positioned more on the − side in the Z-direction toward the + side in the X-direction. In other words, the contact surface of rotation member 132 making contact with restriction member 113 is inclined so as to be positioned more on the restriction member 113 side as placement portion 13 moves in a direction from the outer position toward the inner position.

Thus, as placement portion 13 moves from the outer position to the inner position, rotation member 132 moves up onto restriction member 113 by contact of rotation member 132 with restriction member 113. Accordingly, since the force for rotating rotation member 132 acts on rotation member 132, rotation member 132 can rotate from the restriction position to the non-restriction position, and rotation section 130 can pass the position of restriction member 113.

It is thus possible to position placement portion 13 at the inner position without causing the movement of placement portion 13 from the outer position to the inner position to be restricted by restriction member 113. That is, in the present embodiment, rotation member 132 can be automatically rotated along with the movement of placement portion 13 from the outer position to the inner position without using a complicated mechanism. Thus, a simple configuration can be achieved.

Further, manipulation member 131 is disposed which is capable of rotating rotation member 132 when battery 2 is positioned at the inner position, and which is positioned at the outer end portion of placement portion 13. Thus, when battery 2 is pulled out to the outer position, the operator can easily release the restriction by restriction member 113 by manipulating manipulation member 131.

In other words, since battery 2 can be pulled out at a timing intended by the operator (a timing at which manipulation member 131 is manipulated), it is possible to prevent battery 2 from being pulled out at a timing not intended by the operator.

In addition, since notch 13C is disposed at a part of placement portion 13 overlapping with the rotation range of manipulation member 131, it is possible to suppress manipulation portion 131B from interfering with placement portion 13 when manipulation member 131 is manipulated.

In the above embodiment, restriction member 113 is disposed on the vehicle 1 side and rotation section 130 is disposed on the placement portion 13 side, but the present disclosure is not limited thereto, and the restriction member may be disposed on the placement portion (movement section) side and the rotation section may be disposed on the vehicle side.

In the above-described embodiment, manipulation member 131 is manipulated by a manual operation of the operator, but the present disclosure is not limited thereto, and the manipulation member may be manipulated by an apparatus which is capable of releasing the restriction of the rotation section.

Although biasing member 133 is provided in the above-described embodiment, the present disclosure is not limited to this, and the biasing member does not have to be provided. In this case, for example, the rotation section may return to the restriction position by its own weight or the like.

Further, in the above-described embodiment, notch 13C is disposed at the part of placement portion 13 overlapping with manipulation member 131, but when the rotation range of manipulation member 131 and placement portion 13 do not overlap with each other, the notch does not have to be provided.

Further, in the above-described embodiment, manipulation member 131 is positioned at the position corresponding to the outer end portion of placement portion 13 when battery 2 is positioned at the inner position, but the present disclosure is not limited thereto, and the manipulation member does not have to be positioned at the position corresponding to the outer end portion of placement portion 13. In this case, for example, it is preferable that the manipulation member can be easily manipulated by using the aforementioned apparatus or the like which is capable of releasing the restriction by the rotation section.

The embodiments above are no more than specific examples in carrying out the present disclosure, and the technical scope of the present disclosure is not to be construed in a limitative sense due to the specific examples. That is, the present disclosure can be implemented in various forms without departing from its spirit or key features.

This application is entitled and claims the benefit of Japanese Patent Application No. 2023-014057, filed on Feb. 1, 2023, the disclosure of which including the specification, drawings and abstract is incorporated herein by reference in its entirety.

Industrial Applicability

The restriction apparatus of the present disclosure is useful as a restriction apparatus capable of suppressing the battery from being pulled out at a timing unintended by an operator.

The invention claimed is:

1. A restriction apparatus, comprising:

a movement section that moves a battery between a mounting position and a replacement position in a vehicle;

a rotation section disposed on either one of the movement section and the vehicle side, the rotation section being configured to rotate between a first position and a second position; and a restriction section that is disposed on an other of the movement section and the vehicle, the restriction section being configured to restrict movement of the movement section from the mounting position by making contact with the rotation section located at the first position in a state where the movement section is located at the mounting position, wherein during when the movement section moves from the replacement position to the mounting position, the rotation section makes contact with the restriction section to rotate from the first position to the second position, and the rotation section passes a position of the restriction section to return to the first position, the rotation section includes a rotation member and a biasing member for biasing the rotation member toward the first position, and the biasing member automatically returns the rotation member to the first position after the rotation member passes a position of the restriction section.

2. The restriction apparatus according to claim 1, wherein the restriction section opposes the movement section in an orthogonal direction perpendicular to a direction of the movement section, and a contact surface of the rotation member making contact with the restriction section when the battery moves from the replacement position to the mounting position is inclined such that the contact surface is positioned further away from the movement section in the orthogonal direction as the contact surface is positioned further from the mounting position.

3. The restriction apparatus according to claim 1, wherein the rotation section includes a manipulation member that is manipulatable to rotate the rotation member in a state in which the battery is in the mounting position, the manipulation member being disposed at a position corresponding to an outer end portion of the movement section.

4. The restriction apparatus according to claim 2, wherein:

the movement section includes a support member for supporting the rotation member, and a portion of the movement section overlapping with a rotation range of the manipulation member is notched.

5. The restriction apparatus according to claim 1, wherein in a state in which the battery is in the mounting position, the restriction section makes contact with the rotation section to restrict movement of the battery from the mounting position to the replacement position.

* * * * *